United States Patent Office 3,393,160
Patented July 16, 1968

3,393,160
PROCESS FOR PRODUCING SULFONATED
CATION EXCHANGERS
Herbert Corte, Opladen, Harold Heller, Leichlingen, and Otto Netz, Cologne-Ehrenfeld, Germany, assignors to Farbenfabriken Bayer Aktiengesellschaft, Leverkusen, Germany, a corporation of Germany
No Drawing. Filed Mar. 8, 1966, Ser. No. 532,566
Claims priority, application Germany, May 3, 1965,
F 45,949
3 Claims. (Cl. 260—2.2)

ABSTRACT OF THE DISCLOSURE

A process for producing cation exchangers by sulfonating a crosslinked aromatic vinyl polymer with chlorosulfonic acid in the presence of phosphorus trichloride and a swelling agent for the polymer.

---

This invention relates to a process for the production of sulfonated cation exchangers which are free of discoloration.

Cation exchangers prepared by the sulfonation of crosslinked aromatic vinyl polymers, are pale yellow to deep brown in color, depending on the sulfonation conditions. The more drastic the sulfonation reaction, the darker are the resulting cation exchangers in color. The lightest products are obtained by sulfonating such polymers while suspended in a swelling agent, by means of chlorosulfonic acid at low temperatures (U.S. Patent 2,500,149). The cation exchangers obtained in this way are pale yellow in color.

Colorless or white cation exchangers can be used to particular advantage in the food industry, in mixed bed filters and in the production of cation exchangers which are dyed with pH indicators.

It has now been found that the production of cation exchangers by sulfonation of cross-linked vinylaromatic polymers with chlorosulfonic acid in organic swelling agents, yields products which generally are lighter in color, if sulfonation is carried out in the presence of phosphorus trichloride.

This effect is apparent event in cases where the phosphorus trichloride is added only in small quantities, for example amounting to 3% of the amount of chlorosulfonic acid used. The quantity of phosphorus trichloride required to produce the desired effect is from about 2 to 50% by weight, preferably from 5 to 20% by weight, based on the quantity of chlorosulfonic acid.

The preferred swelling agents are halogenated aliphatic hydrocarbons such as ethylene chloride, methylene chloride, chloroform, tetrachloroethane, tetrachloroethylene. Further suitable swelling agents are halogenated aromatic hydrocarbons such as normally liquid chlorinated benzenes. The amount of swelling agent depends on the degree of cross-linking of the polymers and is preferably so chosen that a stirrable suspension of the polymer in the swelling agent results.

In the process according to the invention, the polymer may, for example, be swollen together with phosphorus trichloride in the swelling agent and then sulfonated with chlorosulfonic acid, or initially swollen in the swelling agent, followed by the addition of phosphorus trichloride and then by sulfonation with chlorosulfonic acid, or swollen in the swelling agent and then sulfonated with a cooled mixture of chlorosulfonic acid and phosphorus trichloride preferably dissolved in further quantities of swelling agent. Alternatively, the phosphorus trichloride may be added to the sulfonation mixture either during or towards the end of sulfonation.

The sulfonation process may be carried out at temperatures of about 0 to 50° C., preferably from 5 to 20° C. Although temperatures in this range may be exceeded, this occasionally has a harmful effect on the results.

Any type of cross-linked vinyl aromatic polymer which is capable of being transformed into cation exchangers by sulfonation, may be subjected to the process according to the invention. Examples of such polymers are cross-linked polymers of styrene, ethyl-vinyl benzene, vinyl toluene and vinyl naphthalene. Suitable cross-linking agents for the production of such polymers are divinyl benzene, or trivinyl benzene, which may be used in amounts of about 1–50%, preferably 5–30% as calculated on the weight of the total monomers. The cross-linked polymers may be of the ordinary gel-type or they may have a so-called macroreticular or "sponge" structure. Gel-type polymers are obtained while polymerising the aforementioned monomers in the absence of any organic solvents or in the presence of organic solvents which are swelling agents for the polymers. Polymers with a so-called "sponge" structure may be obtained by polymerising the aromatic vinyl compounds together with the cross-linking agent in organic solvents (for example heptane) which dissolve the monomers, by which have neither a dissolving nor swelling effect on the polymers (cf. British Patents 885,719 and 894,391). If, in the sulfonation of this last mentioned type of polymers phosphorus trichloride is not used, the resulting exchangers are dirty grey in color.

In order to work up the products of sulfonation, any excess of chlorosulfonic acid, together with the swelling agent containing the phosphorus trichloride may be suction-filtered, the cation exchanger made into a paste with pure swelling agent or even with another solvent, and then slowly diluted either with water or with dilute lye. Alternatively, the sulfonation mixture may be directly diluted with water and then, if required, neutralized with lye. Following removal of the solvent by distillation, and neutralization, the salt form of the cation exchanger is obtained.

In order to determine the effect of the process according to the invention, the Lovibond color indices of the exchangers obtained with and without the addition of phosphorus trichloride were determined under reflected light in a Lovibond Tintometer.

EXAMPLE 1

Four 500 g. batches (a, b, c and d) of a styrene bead polymer crosslinked with 10% divinyl benzene, were swollen in 1500 ml. of ethylene chloride, (a) In the absence of phosphorus trichloride
(b) In the presence of 50 g. of phosphorus trichloride
(c) In the presence of 100 g. of phosphorus trichloride
(d) In the presence of 200 g. of phosphorus trichloride.

After 4 hours at 25° C., the beads were fully swollen. The batches were then cooled to 15° C., after which 700 g. of chlorosulfonic acid were added dropwise with stirring to each batch over a period of 2 hours at a temperature of from 15 to 20° C. After another 4 hours at 15 to 20° C., there was hardly any further evolution of HCl. 500 ml. of water were then introduced dropwise at 15 to 20° C. which involved further cooling, after which the separate reaction mixtures were made alkaline by the dropwise introduction of 45% soda lye. The ethylene chloride was then removed with steam, and the exchangers washed neutral in the filter with desalted water. The color values of the reflected light were determined in a Lovibond Tintometer, yielding the following results.

|     | Red | Yellow | Blue |
| --- | --- | --- | --- |
| (a) | 1.2 | 4.4 | 0 |
| (b) | 0.6 | 2.2 | 0 |
| (c) | 0.5 | 2.1 | 0 |
| (d) | 0.4 | 2.0 | 0 |

EXAMPLE 2

Two 500 g. batches (a and b) of a poly-p-vinyl toluene crosslinked with 8% divinyl benzene, were each swollen in 1000 ml. of ethylene chloride at 25° C.

(a) In the absence of phosphorus trichloride
(b) In the presence of 100 g. of phosphorus trichloride.

After a swelling time of 8 hours, 500 ml. of ethylene chloride were added to each batch, followed by cooling and then by dropwise addition, with stirring, to each batch 700 g. of chlorosulfonic acid over a period of 1½ hours at 10 to 15° C. After another 6 hours' stirring at 10 to 15° C., 1000 ml. of water were added dropwise at 15 to 20° C. The reaction mixtures were then made alkaline at 20 to 25° C. by the dropwise addition of 45% soda lye. The ethylene chloride was then removed with steam and the reaction products which by now were acid again, were made neutral in the filter by treatment with 5% sodium chloride solution.

Determination of the colour values as in Example 1, yielded the following results:

|     | Red | Yellow | Blue |
| --- | --- | --- | --- |
| (a) | 2.2 | 7.9 | 0.2 |
| (b) | 0.3 | 2.4 | 0 |

EXAMPLE 3

Two 500 g. batches (a and b) of a polystyrene bead polymer of sponge-like structure crosslinked with 20% divinyl benzene, of the type obtained by suspension polymerisation of the monomers in the presence of 80% white spirit (B.P. 160–196° C.), based on the weight of the monomers, were each swollen in 1500 ml. of ethylene chloride at 30° C.

(a) In the absence of phosphorus trichloride
(b) In the presence of 70 g. of phosphorus trichloride.

After a swelling time of 10 hours, 700 g. of chlorosulfonic acid were added dropwise to each batch with vigorous stirring over a period of 1½ hours at 10 to 15° C., stirring being continued for another 6 hours at 10 to 15° C. The reaction liquid was then suction-filtered in each case and the residues made stirrable by the addition of 800 ml. of ethylene chloride. After the dropwise addition of 1000 ml. of water to each batch at 10 to 15° C., the reaction mixtures were again suction-filtered and, having been made into a paste with water, were made alkaline by the addition of 45% soda lye. Following removal of the ethylene chloride with steam, the reaction products were washed neutral in the filters.

Determination of the color values as in Example 1 yielded the following results:

|     | Red | Yellow | Blue |
| --- | --- | --- | --- |
| (a) | 0.6 | 0.8 | 0 |
| (b) | 0 | 0 | 0 |

EXAMPLE 4

Two 500 g. batches of a polystyrene bead polymer of sponge-like structure crosslinked with 8% divinyl benzene, as obtained by suspension polymerisation of the monomers in the presence of 55% isododecane (hydrogenated triisobutene) based on the weight of the monomers, were each swollen for 6 hours at 25 to 30° C. in 1500 ml. of ethylene chloride (a) In the absence of phosphorus trichloride
(b) In the presence of 100 g. of phosphorus trichloride.

700 g. of chlorosulfonic acid were then added dropwise with stirring to each batch over a period of 2 hours at 5 to 15° C., the mixtures being stirred for another 5 hours at this temperature.

The reaction liquids were then suction-filtered, after which the solid reaction products were made stirrable by the addition of 800 ml. of ethylene chloride to each. 1000 ml. of water were then added dropwise at 15 to 20° C. After repeated filtration under suction, the reaction products were re-washed with water, made into a paste with water and made alkaline by the dropwise addition of 20% soda lye. The ethylene chloride was then removed with steam and the reaction products washed neutral in the filters with desalted water.

Determination of the color values as in Example 1 yielded the following results:

|     | Red | Yellow | Blue |
| --- | --- | --- | --- |
| (a) | 0.2 | 0.6 | 0 |
| (b) | 0 | 0 | 0 |

EXAMPLE 5

Four 500 g. batches (a, b, c and d) of a styrene bead polymer crosslinked with 8% divinyl benzene, were swollen in 1500 ml. of ethylene chloride (a) In the absence of phosphorus trichloride
(b) In the presence of 100 g. of phosphorus trichloride
(c) In the absence of phosphorus trichloride
(d) In the absence of phosphorus trichloride.

After swelling, 800 g. of chlorosulphonic acid were added to each batch at 30 to 40° C. accompanied in case (c) by the dropwise addition of 100 g. of phosphorus trichloride. 4 hours after the chlorosulfonic acid had been added, 100 g. of phosphorus trichloride were added to batch (d). 5 hours after the chlorosulphonic acid had been added, all the reaction products were suction-filtered to dryness, made into a paste with 800 ml. of ethylene chloride, mixed with 1000 ml. of water at 30 to 40° C., suction-filtered again, re-washed with water and then made alkaline with 20% soda lye. After the ethylene chloride had been removed with steam and the reaction products washed neutral with desalted water, the following color values were determined in accordance with Example 1.

|     | Red | Yellow | Blue |
| --- | --- | --- | --- |
| (a) | 3.6 | 9.0 | 1.0 |
| (b) | 0.9 | 4.5 | 0 |
| (c) | 1.1 | 5.0 | 0 |
| (d) | 1.6 | 6.0 | 0 |

EXAMPLE 6

500 g. of a styrene bead polymer crosslinked with 8% divinyl benzene were swollen for 8 hours at 20 to 25° C. in a mixture of 1500 ml. of methylene chloride and 85 g. of phosporus trichloride (batch A). For comparison, 500 g. of the same bead polymer were swollen for 8 hours at 20 to 25° C. in 1500 ml. of methylene chloride, on this occasion in the absence of phosphorus trichloride (batch B).

Both batches were cooled to 5° C., after which 850 g. of chlorosulfonic acid were added dropwise to each with stirring and continued cooling so that the temperature did not rise above 10° C. After another 5 hours' stirring at 5 to 10° C., the solvents were removed by filtration under suction. 800 ml. of fresh methylene chloride were added to each sulphonation product, followed by the dropwise addition, with cooling, at 10 to 15° C. of 1000 ml. of water and of so much 45% soda lye that the reaction mixtures were clearly alkaline. The methylene chloride was then removed with steam from each mixture, and the sulfonation products finally washed neutral.

Determination of the color values in accordance with Example 1, yielded the following results:

|     | Red | Yellow | Blue |
|-----|-----|--------|------|
| (A) | 0.1 | 1.1    | 0    |
| (B) | 1.1 | 4.9    | 0    |

EXAMPLE 7

As in Example 6, two 500 g. batches of a styrene bead polymer crosslinked with 8% divinyl benzene, were each swollen for 10 hours at 20 to 25° C. in 1500 ml. of methylene chloride (A) In the presence of 100 g. of phosphorus trichloride (B) In the absence of phosphorus trichloride.

After the two batches had been cooled to 5 to 10° C., 1000 g. of chlorosulfonic acid were added dropwise to each with stirring and continued cooling to 5 to 10° C. Stirring was cotinued for another 5 hours at 5 to 10° C. after which the solvent was removed by filtration under suction. Following the addition to each batch of 800 ml. of fresh methylene chloride, 1000 ml. of water were added dropwise at 15 to 20° C. The two reaction mixtures were made alkaline with 45% soda lye, and the methylene chloride removed with steam. Finally, they were washed neutral with water.

Determination of the color values as in Example 1 yielded the following results:

|     | Red | Yellow | Blue |
|-----|-----|--------|------|
| (A) | 0.4 | 2.4    | 0    |
| (B) | 1.4 | 5.9    | 0    |

EXAMPLE 8

Four 500 g. batches (a, b, c and d) of a styrene bead polymer crosslinked with 8% divinyl benzene, were each swollen for 16 hours at room temperature in 1500 ml. of methylene chloride (A) In the absence of phosphorus trichloride
(B) In the presence of 50 g. of phosphorus trichloride
(C) In the presence of 100 g. of phosphorus trichloride
(D) In the presence of 200 g. of phosphorus trichloride.

After the four batches had each been cooled to 5 to 10° C., 700 g. of chlorosulphonic acid were added with stirring to each over a period of 75 minutes. Stirring was continued for another 5 hours during which the temperature was kept constant. At the end of this time, the evolution of HCl was almost at an end. The reaction solutions were then suction-filtered. 800 ml. of fresh methylene chloride were then introduced into each batch followed by the dropwise addition of 1000 ml. of water at 10 to 15° C. The reaction solutions were then suction-filtered again, after which each batch was washed once with 1000 ml. of fresh water, made into a paste with 1000 ml. of water and made alkaline by the addition of 45% soda lye at 10 to 15° C. Finally, the residual methylene chloride was removed with steam, and the exchangers washed neutral in filter tubes with fully desalted water. The color values of the light reflected by the respective exchanger resins were determined in a Lovibond Tintometer:

|     | Red | Yellow | Blue |
|-----|-----|--------|------|
| (a) | 1.1 | 5.1    | 0.2  |
| (b) | 0.2 | 1.6    | 0.3  |
| (c) | 0.4 | 2.4    | 0.2  |
| (d) | 0.6 | 2.4    | 0.2  |

EXAMPLE 9

Four 500 g. batches (a, b, c and d) of styrene bead polymer crosslinked with 8% divinyl benzene, were swollen for 16 hours at room temperature in 1500 ml. of chloroform (a) In the absence of phosphorus trichloride
(b) In the presence of 25 g. of phosphorus trichloride
(c) In the presence of 50 g. of phosphorus trichloride
(d) In the presence of 100 g. of phosphorus trichloride.

Each batch was then cooled to 5 to 10° C. The procedure was then as in Example 8, except that the methylene chloride used to work up the reaction products was replaced by chloroform. The color values of the respective exchanger resins as determined with a Lovibond Tintometer, were as follows:

|     | Red | Yellow | Blue |
|-----|-----|--------|------|
| (a) | 1.0 | 4.2    | 0.3  |
| (b) | 0.4 | 2.0    | 0.1  |
| (c) | 0.4 | 1.9    | 0.1  |
| (d) | 0.5 | 1.9    | 0.1  |

We claim:

1. In a process for producing cation exchangers by sulfonating a cross-linked aromatic vinyl polymer while in contact with a swelling agent for said polymer by means of chlorosulfonic acid the improvement which comprises carrying out said sulfonation reaction in the present of phosphorus trichloride.

2. Process according to claim 1, wherein the quantity of phosphorus trichloride is between 2 and 50% by weight of the quantity of the chlorosulfonic acid.

3. Process according to claim 1, wherein said cross-linked aromatic vinyl polymer is a styrene/divinylbenzene or a vinyl-toluene/divinylbenzene copolymer.

References Cited

UNITED STATES PATENTS

| 2,928,860 | 3/1960 | Harrington | 260—458 |
| 3,072,618 | 1/1963 | Turbak | 260—79.3 |

FOREIGN PATENTS

| 960,049 | 6/1964 | Great Britain. |
| 6408570 | 2/1965 | Netherlands. |

OTHER REFERENCES

Dow Chemical Co., Midland, Michigan, Dowex: Ion Exchange, 1964 (pp. 6 and 7).

WILLIAM H. SHORT, *Primary Examiner.*

M. GOLDSTEIN, *Assistant Examiner.*